United States Patent [19]

Duffer et al.

[11] Patent Number: 4,489,106

[45] Date of Patent: Dec. 18, 1984

[54] TWO STEP INTERLEAVING METHOD

[75] Inventors: Paul F. Duffer, Creighton; Helmut Franz, Pittsburgh; Joseph D. Kelly, Cheswick, all of Pa.

[73] Assignee: PPG Industries, Inc., Pittsburgh, Pa.

[21] Appl. No.: 427,398

[22] Filed: Sep. 29, 1982

[51] Int. Cl.[3] .............................................. B05D 1/36

[52] U.S. Cl. ................................... 427/154; 427/202; 427/389.7; 427/314; 428/426; 428/441

[58] Field of Search .............. 428/438, 441, 421, 426; 427/202, 421, 154, 389.7, 314

[56] References Cited

U.S. PATENT DOCUMENTS

| | | | |
|---|---|---|---|
| 3,723,312 | 3/1973 | Hay, Jr. | 252/11 |
| 3,798,112 | 3/1974 | Hay, Jr. | 161/162 |
| 4,011,359 | 3/1977 | Simpkin et al. | 428/326 |
| 4,200,670 | 4/1980 | Albach | 427/154 |

*Primary Examiner*—George F. Lesmes
*Assistant Examiner*—E. Rollins Buffalow
*Attorney, Agent, or Firm*—Donna L. Seidel

[57] ABSTRACT

A method is disclosed for protecting glass surfaces in a stack of glass sheets by treating the surfaces with a stain-inhibiting organic hydroxy acid and separating adjacent surfaces with an interleaving material.

8 Claims, No Drawings

TWO STEP INTERLEAVING METHOD

BACKGROUND OF THE INVENTION

The present invention relates generally to the art of protecting a glass surface from staining, and more particularly to the art of applying a stain inhibiting agent in combination with a physical spacing material.

Glass sheets are typically stacked in face-to-face relationship for handling, transportation and storage. Unfortunately, stacked glass sheets are susceptible to scratches caused by relative movement between adjacent surfaces, and staining caused by alkali buildup between adjacent surfaces degrading the original colorlessness and transparency of the glass.

It is well known in the art to separate adjacent glass surfaces by interposing sheets of paper between the sheets of glass to protect the glass surfaces. However, the techniques for utilizing paper interleaving are time-consuming and costly. Less expensive means for separating glass sheets utilize particulate interleaving materials, which include natural products, such as wood flour, and synthetic products such as polyethylene, polystyrene or polyacrylate beads. While these inert interleaving materials provide a measure or scratch protection at relatively low cost, staining remains a significant problem.

U.S. Pat. No. 3,723,312 to Hay addresses the problems of staining and scratching of packaged glass sheets. In place of interleaving paper, Hay proposes the use of dedusted agglomerated salicylic acid in conjunction with an inert particulate separator material, such as wood flour or polystyrene, applied at a rate such that one pound of interleaving material protects no more than 4000 square feet, preferably 1000 to 3000 square feet, of glass. According to Hay, use of agglomerated salicylic acid mixed in equal proportion with inert polystyrene is effective to eliminate staining for nearly as long as interleaving paper, with application costs which approximate those for wood flour or methyl methacrylate which have no particular stain inhibiting properties.

U.S. Pat. No. 3,798,112 to Hay also discloses a mixture of dedusted agglomerated salicylic acid and inert separator material, providing a novel method for agglomerating the acid with polyethylene oxide to produce an interleaving material comprising substantially spherical particles less than about 30 mesh which is applied to glass sheet surfaces at a rate of about one pound covering not more than about 4000 square feet. The interleaving material may further comprise an inert particulate separating material such as wood flour, polystyrene or LUCITE® methacrylate polyester beads in a ratio up to about 4:1 with respect to the agglomerated organic acid.

U.S. Pat. No. 4,011,359 to Simpkin et al discloses an interleaving material for separating glass sheets and protecting them from scratching and staining which comprises a porous, finely divided support material, impregnated with a weakly acidic material, and fine particles of a chemically inert plastic material. The porous support material may be a cellulose material of vegetable origin or a wood flour. The weakly acidic material is a weak organic acid, preferably an organic acid having 3 to 10 carbon atoms, and especially adipic, maleic, sebacic, succinic, benzoic and salicylic acids. The inert plastic separator material may be polyethylene, polystyrene, polytetrafluoroethylene or a methacrylate polyester, and preferably has a larger particle size than the acid-impregnated support material. The interleaving material may be applied to the glass by conventional powder applicators.

U.S. Pat. No. 4,200,670 to Albach describes a method for protecting glass sheets during packing, shipping and storing. The method involves applying water, a stain inhibiting material, and dry, finely divided particles of a mechanical separator to the surfaces of glass sheets prior to stacking them, in a plurality of sequential steps that produce an adherent coating on each glass sheet, which coating becomes a protective interleaving between facing surfaces when the sheets are stacked. According to one specific embodiment, this is accomplished by applying the water and stain inhibitor to the glass as an aqueous solution to provide a wet layer on the sheet surface, and then separately applying a dry particulate layer of a mechanical separator to the wet layer. The method can also be carried out by first spraying the glass surface with water alone and then separately applying a layer or layers of a stain inhibitor and a mechanical separator in dry powdered form to the layer of water, or by first applying a mixture of dry powdered stain inhibitor and mechanical separator and then spraying the dry materials with water.

SUMMARY OF THE INVENTION

The present invention provides a method for protecting a glass surface from staining and scratching by treating the glass surface with a solution of a stain-inhibiting organic hydroxy acid and drying the surface prior to dispersing a finely divided particulate interleaving material on the glass surface. The hydroxy acids of the present invention are superior stain-inhibitors compared with known acid stain-inhibitors, and also are more readily soluble in water.

DESCRIPTION OF THE PREFERRED EMBODIMENTS

Glass sheets are treated with a stain-inhibiting organic acid solution and dried prior to applying a particulate interleaving material in order to provide enhanced stain and scratch resistance in the course of handling, stacking, transportation and storage.

Treatment of the glass surface with a solution of stain-inhibiting organic acid in accordance with the present invention is carried out preferably by contacting the glass surface with an aqueous solution of the stain-inhibiting organic acid by any conventional technique, preferably spraying, at a temperature sufficient to achieve immediate evaporation of the solvent, preferably a temperature of about 110° to 180° F. (about 43° to 82° C.).

The concentration of stain-inhibiting organic hydroxy acid in the solution is preferably greater than 0.1 percent, more preferably in the range of about 0.5 to 1 percent. Preferred stain-inhibiting organic acids are hydroxy dicarboxylic acids, especially malic acid, preferably applied to a glass surface which is at a temperature of about 140° to 160° F. (about 60° to 71° C.).

In a preferred embodiment of the present invention, an aqueous solution of about 0.5 to 1 percent malic acid is sprayed onto a glass surface at a temperature of about 140° to 160° F. (about 60° to 71° C.). The solution essentially dries on contact with the hot glass surface, leaving a film of malic acid on the glass surface. The acid treated glass surfaces are separated by any suitable interleaving material, preferably a particulate interleaving material. For example, various synthetic materials such as polyethylene, polystyrene, polytetrafluoroethylene and polyacrylate beads are acceptable, as well as natural porous cellulose materials such as wood flour and rice flour, typically applied at rates of about one pound per 5000 to 9000 square feet of glass.

It appears that the acidic organic stain-inhibiting compounds neutralize alkali buildup between stacked glass sheets which is believed to cause the staining which typically occurs on the surface of packaged glass sheets. The stain-inhibiting treatment, in combination with the interleaving material offers optimum protection of the treated glass surfaces from staining and scratches.

The present invention will be further understood from the description of specific examples which follow.

EXAMPLE I

Sheets of soda-lime-silica float glass are sprayed at a temperature of about 140° to 160° F. (about 60° to 71° C.) with an aqueous solution containing two percent malic acid. The solution essentially dries on contact with the hot glass surface leaving a film of malic acid on the glass surface. The sheets are then dusted with one pound rice flour per 7500 square feet of glass. The treated sheets are stacked and placed in a humidity chamber for accelerated staining tests. After exposure to conditions of 140° F. (about 60° C.) and 100 percent relative humidity for 39 days, the treated glass looked very good, with no visible stain.

EXAMPLE II

On a larger scale, the top surface of a freshly-formed and annealed float glass ribbon is sprayed at a temperature of about 140° F. (about 61° C.) with an aqueous solution containing 0.1 percent of malic acid. The dry, acid-treated surface, which bears about 15–20 milligrams of malic acid per square foot of glass, is dusted with wood flour using conventional powder application equipment set to distribute one pound of interleaving material to about 7500 square feet of glass. Sheets of treated glass are stacked and exposed to 140° F. (about 60° C.) at 100 percent relative humidity. For comparison, sheets of glass, not treated with malic acid but dusted with wood flour at the same level of distribution, are also tested. After 30 days exposure, the malic acid treated glass shows no stain while the glass only dusted with wood flour is stained throughout after about 3 to 5 days exposure.

The above examples are offered to illustrate the present invention, the scope of which is defined by the following claims.

We claim:

1. A method for protecting a glass surface which comprises the steps of:

a. contacting the glass surface with a solution of stain-inhibiting organic hydroxy acid;

b. evaporating the solvent to deposit a dried film of stain-inhibiting organic hydroxy acid on the glass surface; and c. applying a particulate interleaving material to the acid-treated glass surface prior to contacting the glass surface in facing relationship with another glass surface.

2. The method according to claim 1, wherein the glass surface is treated with an aqueous solution of a hydroxy dicarboxylic acid.

3. The method according to claim 2, wherein the glass surface is treated at a temperature from about 110° F. (about 43° C.) to about 180° F. (about 82° C.) with an aqueous solution of malic acid.

4. The method according to claim 3, wherein the glass surface is treated at a temperature of about 140° F. (about 60° C.) to about 160° F. (about 71° C.) with a dilute aqueous solution of about 0.1 to 2 percent malic acid.

5. The method according to claim 1, wherein the particulate solid interleaving material is a porous cellulose material.

6. The method according to claim 5 wherein the interleaving material is wood flour.

7. The method according to claim 5, wherein the particulate solid interleaving material is a synthetic polymer.

8. The method according to claim 7, wherein the interleaving material is selected from the group consisting of polyethylene, polystyrene, polytetrafluoroethylene and polymethylmethacrylate.

* * * * *